(12) United States Patent
Yan (10) Patent No.: US 11,167,811 B2
(45) Date of Patent: Nov. 9, 2021

(54) ROBOTIC OBSTACLE CROSSING DEVICE (71) Applicant: Jason Yan, New Taipei (TW)

(72) Inventor: Jason Yan, New Taipei (TW)

(*) Notice: Subject to any disclaimer, the term of this patent is extended or adjusted under 35 U.S.C. 154(b) by 280 days.

(21) Appl. No.: 16/416,804

(22) Filed: May 20, 2019

(65) Prior Publication Data
US 2020/0331545 A1 Oct. 22, 2020

(30) Foreign Application Priority Data

Apr. 22, 2019 (TW) .................. 108113960

(51) Int. Cl.
*B62D 57/024* (2006.01)
*A47L 11/40* (2006.01)
*G05D 1/02* (2020.01)

(52) U.S. Cl.
CPC ........ *B62D 57/024* (2013.01); *A47L 11/4011* (2013.01); *A47L 11/4061* (2013.01); *G05D 1/0238* (2013.01); *A47L 2201/04* (2013.01); *G05D 2201/0215* (2013.01)

(58) Field of Classification Search
CPC .............. A47L 11/4011; A47L 11/4061; A47L 2201/04; B62D 25/16; B62D 55/06; B62D 57/024; B62D 57/022; G01D 5/142; G01D 5/20; G01S 15/931; G05D 1/0214; G05D 1/0238; G05D 1/0255; G05D 1/0259; G05D 2201/0208; G05D 2201/0215
See application file for complete search history.

(56) References Cited

U.S. PATENT DOCUMENTS

| | | | |
|---|---|---|---|
| 7,555,363 B2 * | 6/2009 | Augenbraun | A47L 5/225 700/253 |
| 8,483,881 B2 * | 7/2013 | Ermakov | B25J 9/0003 700/259 |
| 2019/0171214 A1 * | 6/2019 | Cestonaro | G01D 5/142 |

FOREIGN PATENT DOCUMENTS

CN 106793899 A 5/2017

OTHER PUBLICATIONS

Fude et al., Design and obstacle-climbing performance analysis of arm-wheeled robot based on creo and adams, 2017, IEEE, p. 7555-7559 (Year: 2017).*
Zhou et al., Research on Obstacle Surmounting Performance of All-terrain Eight Wheel Drive Robot, 2018, IEEE, p. 3868-3873 (Year: 2018).*

(Continued)

Primary Examiner — McDieunel Marc
(74) Attorney, Agent, or Firm — Muncy, Geissler, Olds & Lowe, P.C.

(57) ABSTRACT

A robotic obstacle-crossing device mainly includes a wheel body and an obstacle-crossing body, wherein the wheel body includes a wheel part, a first obstacle-crossing part and a second obstacle-crossing part. When the sweeping robot tilts, the plurality of first recessed portions and the plurality of second recessed portions provided on the periphery of the first obstacle-crossing part and the second obstacle-crossing part provide a climbing function. In addition, when the sweeping robot encounters obstacles or steps, the obstacle-crossing body can provide robot the function of the obstacle-crossing or climbing, thereby reducing the number of situations when the sweeping robot is trapped or unable to effectively climb upon encountering an obstacle or a steep road surface.

11 Claims, 5 Drawing Sheets (56) References Cited

OTHER PUBLICATIONS

Wang et al., The optimization of obstacle-crossing and the simulation in ADAMS of the composite six-wheeled-legged robot, 2012, IEEE, p. 2422-2426 (Year: 2012).*

Wang et al., Enhancing the Passing Ability of Unmanned Vehicles Using a Variable-Wheelbase Driving System, 2019, IEEE, p. 1-15 (Year: 2019).*

\* cited by examiner

ROBOTIC OBSTACLE CROSSING DEVICE

BACKGROUND OF THE INVENTION

1. Field of the Invention

The present invention provides a robotic obstacle-crossing device, and more particularly, a robotic obstacle-crossing device that provides a robot obstacle-crossing or climbing function through a wheel body or an obstacle-crossing body.

2. Description of the Prior Art

Science and technology are changing with each passing day. In the robotic industry, self-propelled robots are gradually developing, and the evolution of technology is gradually becoming mature. With the advancement of robotic technology, robots have added various functions, such as production, disaster relief, exploration or cleaning, etc.; and for the current common intelligent sweeping robot, it has been widely used in the families in automatically performing cleaning works. In order to perform the cleaning task itself, it is necessary to have the variety of relevant functions for the task.

When the sweeping robot performs a task, it usually uses a sensor to sense whether there is an obstacle on the travel route to initiate avoidance action. However, when the obstacle is small or the ground is uneven, it may make the sensor unable to effectively sense the obstacle (including the protruding ground when the road surface is uneven), and thus introducing the risk that the cleaning robot may get trapped due to the obstacle.

In order to provide the function of climbing for the cleaning robot, there is already related prior art invention, for example, Chinese Patent Publication No. CN106793899A, which discloses a front wheel that is suspended; as the local surface is not flat, the cleaning robot must climb. When climbing and cleaning, the front wheel can be used to assist the sweeping robot to climb. However, since the front wheel or the rear wheel of the suspension is formed by a circular shape, when the sweeping robot climbs, it is not easy to provide sufficient climbing force to assist the sweeping robot to climb, or when the sweeping robot is tilted due to climbing, it is easy to make one of the walking rear wheels idle, thereby changing the sweeping robot the path to be walked, or causing the situation of trapped sweeping robot.

Therefore, in order to provide a better climbing function of the cleaning robot, and to improve solution to the problem that the cleaning robot may not be able to effectively climb due to tilting, there is an urgent need for an invention that can improve solution to the above problems and facilitate the execution of the cleaning task.

SUMMARY OF THE INVENTION

In order to solve problems disclosed above, an objective of the present invention is to provide a robot obstacle-crossing device, which can be set by a first and a second side of at least one wheel body of the bottom surface of the robot when the robot is tilted, so as to provide the climbing function when the robot is tilted, and to avoid idling or lack of climbing ability causing changed walk path or trapped condition of the robot.

In order to solve the problems disclosed above, another objective of the present invention is to provide a robot obstacle-crossing device, which can be at least one wheel body and at least one obstacle-crossing body of the bottom surface of the robot when the robot climbs, so as to provide sufficient climbing ability of the robot to avoid the well-known problem that the sweeping robot cannot effectively climb.

In order to achieve one of the objectives above, the present invention provides a robotic obstacle-crossing device, comprising:

a robot;

at least one wheel body, being disposed at a bottom position of the robot, and the wheel body comprises:

a wheel part;

a first obstacle-crossing part, being disposed on one side of the wheel part, and a plurality of first recess portions arranged on the periphery of the first obstacle-crossing part; and a second obstacle-crossing part, being disposed on another side of the wheel part, and a plurality of second recess portions arranged on the periphery of the second obstacle-crossing part.

Preferably, wherein the inside of the first recessed portion is provided with a plurality of first fastening portions, with each of the first fastening portions being configured to engage with a solid.

Preferably, wherein the second recessed portion is provided with a plurality of second fastening portions, each of the second fastening portions being configured to engage with a solid.

Preferably, wherein the first recessed portion is interlaced with the set position of the second recessed portion.

Preferably, the robot obstacle-crossing device comprising a driving device connected to the wheel body, the driving device driving the wheel body to rotate.

In order to achieve the other objective above, the present invention provides a robotic obstacle-crossing device, comprising:

a robot;

at least one wheel body, being disposed at a bottom position of the robot; and at least one obstacle-crossing body, being disposed at a bottom position of the robot, and adjacent to the wheel body, the periphery of the obstacle body being provided with a plurality of groove portions;

wherein, the position of the obstacle-crossing body is higher than the wheel body, when the periphery of the wheel body is in contact with a plane, the periphery of the obstacle-crossing body is a distance away from the plane.

Preferably, wherein the wheel body comprises:

a wheel part;

a first obstacle-crossing part, being disposed on one side of the wheel part, and the first obstacle-crossing part being provided with a plurality of first recess portions; and a second obstacle-crossing part, being disposed on another side of the wheel part, and the second obstacle-crossing part being provided with a plurality of second recess portions.

The robotic obstacle-crossing device of claim 7, wherein the first recessed portion is interlaced with the set position of the second recessed portion.

Preferably, the robotic obstacle-crossing device comprising:

a linkage body, being coupled to the wheel body and the obstacle-crossing body, to allow the wheel body and the obstacle-crossing body being simultaneously actuated.

Preferably, the linkage body is provided with a gear set, the gear set comprising:

a wheel body driving wheel, being connected with the wheel body;

a connecting driven wheel, being peripherally meshed with the wheel body driving wheel, and the connecting driven wheel rotating in opposite direction to the wheel body driving wheel; and an obstacle-crossing driven wheel being coupled to the obstacle-crossing body, the periphery of the obstacle-crossing body driven wheel meshing with the connecting driven wheel, and the obstacle-crossing driven wheel rotating in opposite direction to the connecting driven wheel.

Preferably, the first groove portion is internally provided with a plurality of third fastening portions, each of the third fastening portions being provided to engage with a solid.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

DETAILED DESCRIPTION OF THE INVENTION

The specific embodiments are described below to illustrate the embodiments of the present invention, but are not intended to limit the scope of the present invention.

Figure 1:
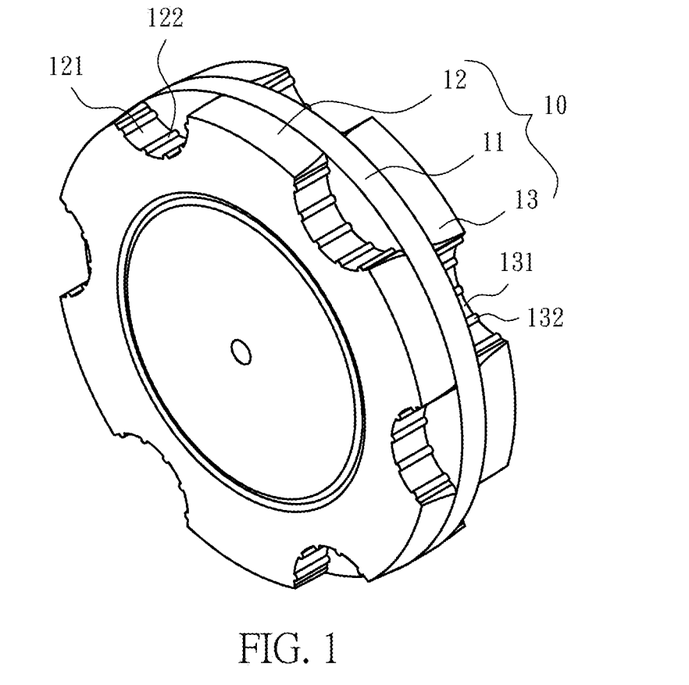
FIG. 1 is a perspective view of a wheel body of the present invention.
Figure 2:
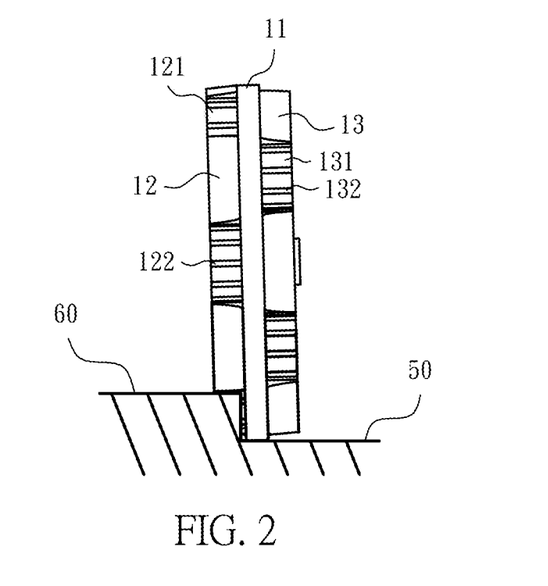
FIG. 2 is a schematic view showing a tilt state of the robot of the present invention.
Figure 3:
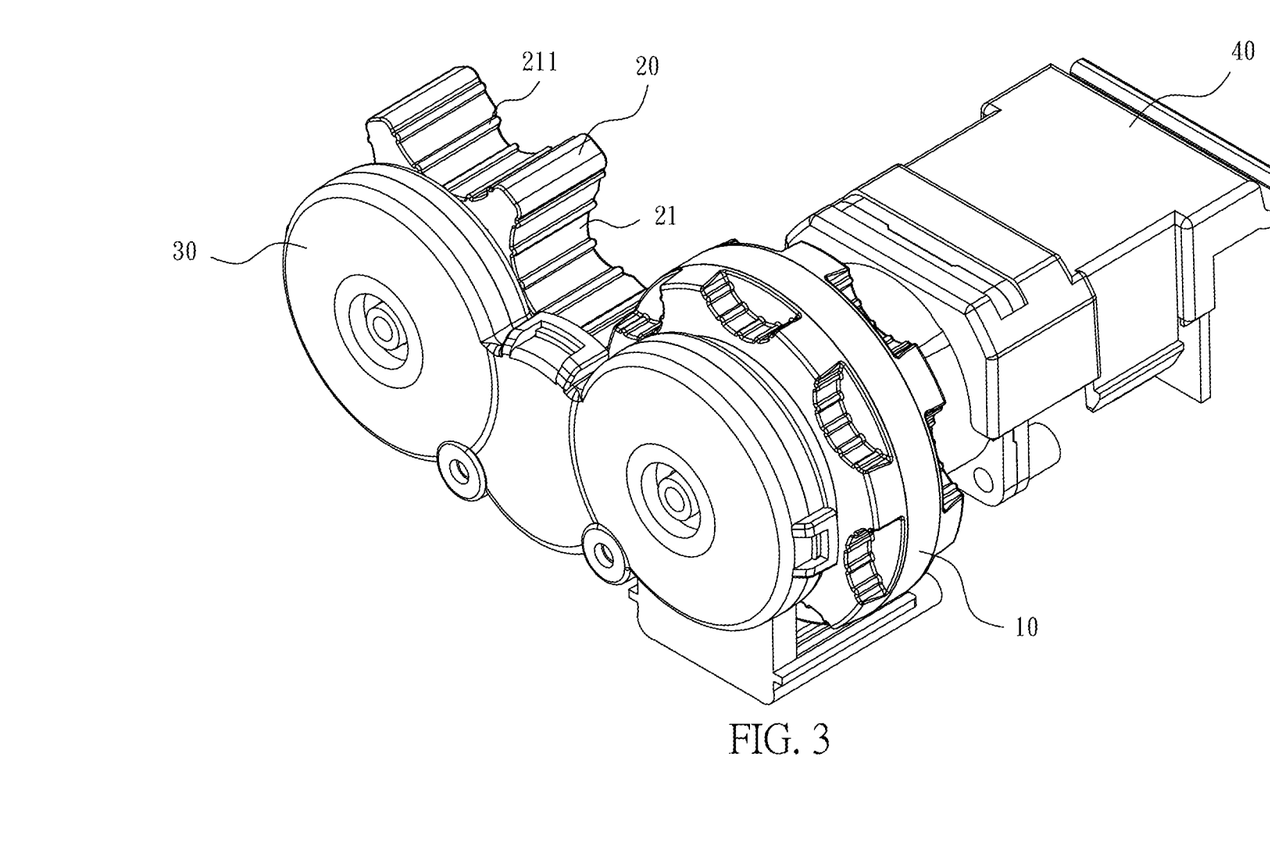
FIG. 3 is a perspective view of the wheel body and the obstacle-crossing of the present invention.

Please refer to FIG. 1 and FIG. 2, which are a perspective view of a wheel body of the present invention and a tilt state of the robot. As shown in the figures, the present invention discloses at least one wheel body 10 mounted on the bottom of a robot. The wheel body 10 includes a wheel part 11 and a first obstacle-crossing part 12 and a second obstacle-crossing part 13 formed on each of the two sides of the wheel part 11. The wheel part 11 is shaped like a round wheel. The obstacle-crossing part 12 and part 13 are each positioned in the opposite side of the wheel part 11, consequently, if the obstacle-crossing part 12 is formed on one side of the wheel part 11, the second obstacle-crossing part 13 will be formed on another side of the wheel part 11.

In addition, a plurality of first recessed portions 121 are disposed around the first obstacle-crossing part 12, and a plurality of second recessed portions 131 are disposed around the second obstacle-crossing part 13. Both the first recessed portion 121 and the second recessed portion 131 are each an arc-shaped recessed portion, and the disposed position of the first recessed portion 121 is interlaced with the disposed position of the second recessed portion 131, so that when the robot utilizes the first recessed portion 121 of the first obstacle-crossing part 12 in climbing, the second obstacle-crossing part 13 and the wheel portion 11 can assist in providing support and grip with a plane 50, and vice versa, when the robot utilizes the second recessed portion 131 of the second obstacle-crossing part 13 in climbing, the first obstacle-crossing part 12 and the wheel portion 11 can also assist in providing support and grip with the plane 50.

Moreover, the first recessed portion 121 and the second recessed portion 131 are provided with a plurality of first fastening portions 122 and a plurality of second fastening portions 132, respectively. The first fastening portion 122 and the second fastening portion 132 are each a semi-arc ridge, to provide the first fastening portion 122 when the robot climbs using the first recess portion 121, or the second fastening portion 132 when the robot climbs using the second recess portion 131, the ability to engaged with a solid 60 (e.g., a step) to increase the resistance of the wheel body 10 to rotate backward. In this way, when the robot is tilted, the first obstacle-crossing part 12 and the second obstacle-crossing part 13 can be leveraged to assist climbing, thereby avoiding changes in the walking path or trapped robot caused by idling climbing mechanism or insufficient climbing power.

Please further refer to FIG. 3 to FIG. 6, which are a perspective view of the wheel body and the obstacle-crossing part of the present invention, an exploded view of the present invention, a schematic view of a gear set, and a schematic view showing the climbing state of the robot, respectively. As shown in the figures, in addition to the wheel body 10, the present invention further provides at least one obstacle-crossing body 20 and a linkage body 30 to interoperate with the wheel body 10, thereby improving the climbing ability of the robot. The obstacle-crossing body 20 is disposed at a bottom position of the robot and adjacent to the wheel body 10. The periphery of the obstacle-crossing body 20 is further provided with a plurality of groove portions 21, and the groove portions 21 are annularly spaced such that the obstacle-crossing body 20 forms a star shape, and each of the groove portions 21 is provided with a plurality of third fastening portions 211 for engaging with the solid 60, so as to increase resistance of backward rotation of obstacle-crossing body 20. Furthermore, the obstacle-crossing body 20 is disposed higher than the wheel body 10 such that as the periphery of the wheel body 10 is in contact with a plane 50, there is still a distance between the periphery of the obstacle-crossing body 20 and the plane 50. Therefore, when the robot walks on the plane 50, the obstacle-crossing body 20 does not contact the plane 50, only when the robot performs the climbing action, the obstacle-crossing body 20 will abut against a high plane 70 for climbing.

Figure 4:
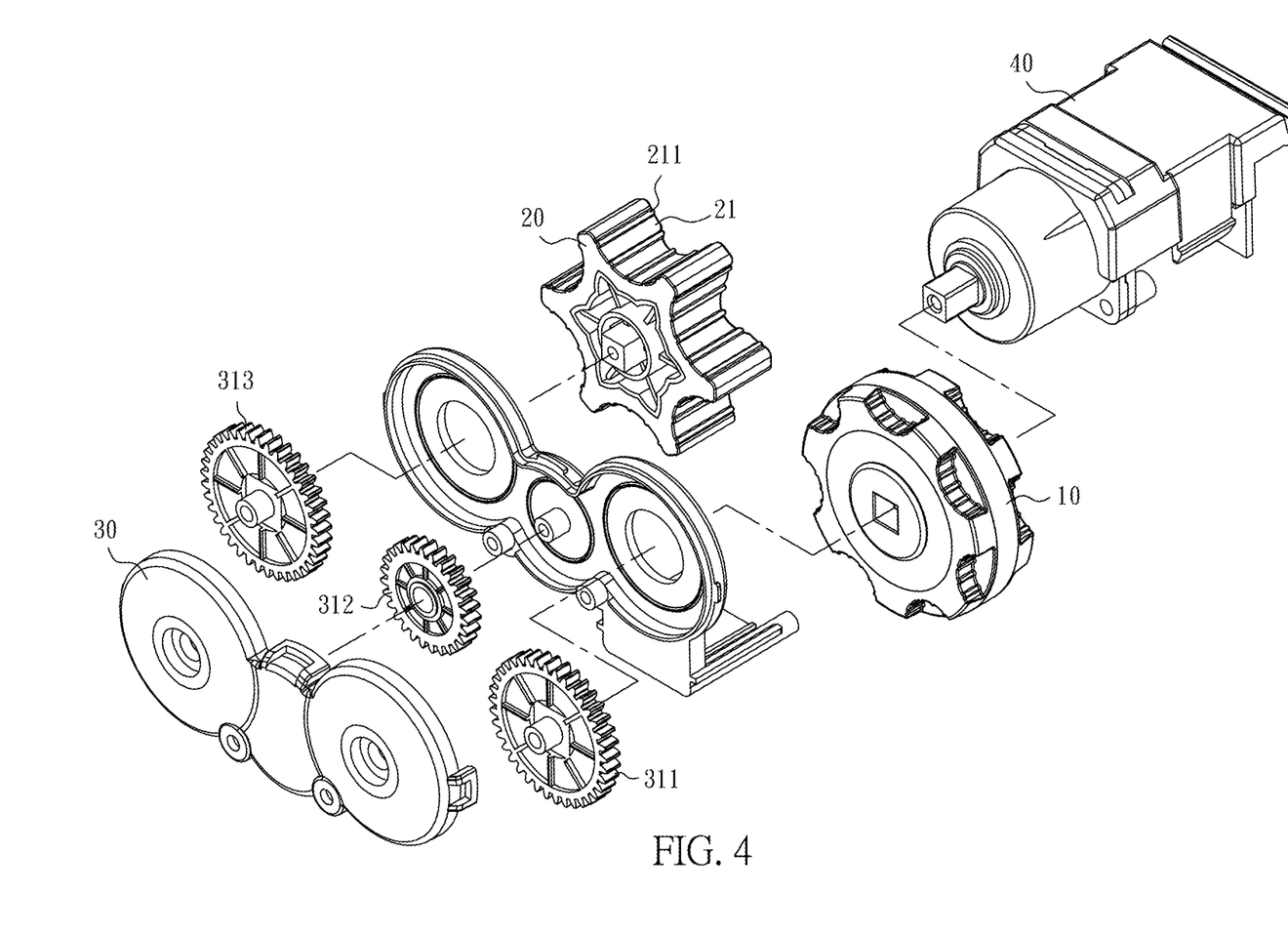
FIG. 4 is an exploded view of the present invention.
Figure 5:
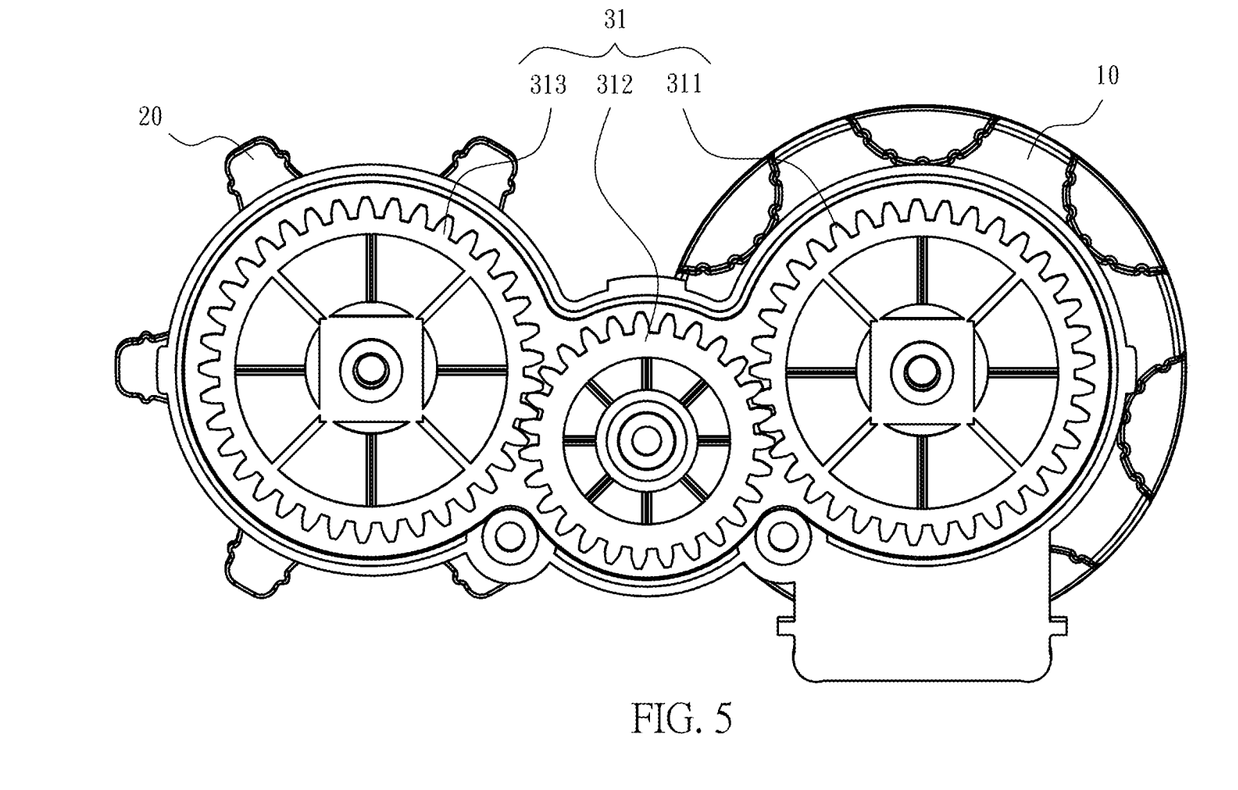
FIG. 5 is a schematic view of a gear set of the present invention.

The linkage body 30 is coupled to the wheel body 10 and the obstacle-crossing body 20, to allow the wheel body 10 and the obstacle-crossing body 20 are simultaneously actuated, wherein the linkage body 30 is provided with a gear set 31. The gear set 31 includes a wheel body driving wheel 311, a connecting driven wheel 312 and an obstacle-crossing body driven wheel 313. The wheel body driving wheel 311 is connected with the wheel body 10, so when the wheel body 10 rotates, the wheel body driving wheel 311 will rotate accordingly. The periphery of the connecting driven wheel 312 meshes with the wheel body driving wheel 311, and is opposite to the rotating direction of the wheel body driving wheel 311, so when the wheel body driving wheel 311 rotates clockwise, the connecting driven wheel 312 rotates counterclockwise. The obstacle-crossing body driven wheel 313 is connected with the obstacle-crossing body 20, so when the obstacle-crossing body driven wheel 313 rotates, the obstacle-crossing body 20 will rotate accordingly. The periphery of the obstacle-crossing body driven wheel 313 is meshed with the connecting driven wheel 312, and is opposite to the rotating direction of the connecting driven wheel 312. Thus, when the connecting driven wheel 312 rotates counter-clockwise, the obstacle-crossing body driven wheel 313 will rotate clockwise, driving obstacle-crossing body 20 into clockwise rotation.

In addition, the wheel body 10 is coupled to a driving device 40, and the driving device 40 drives the wheel body 10 to rotate, thereby driving the robot to move.

Figure 6:
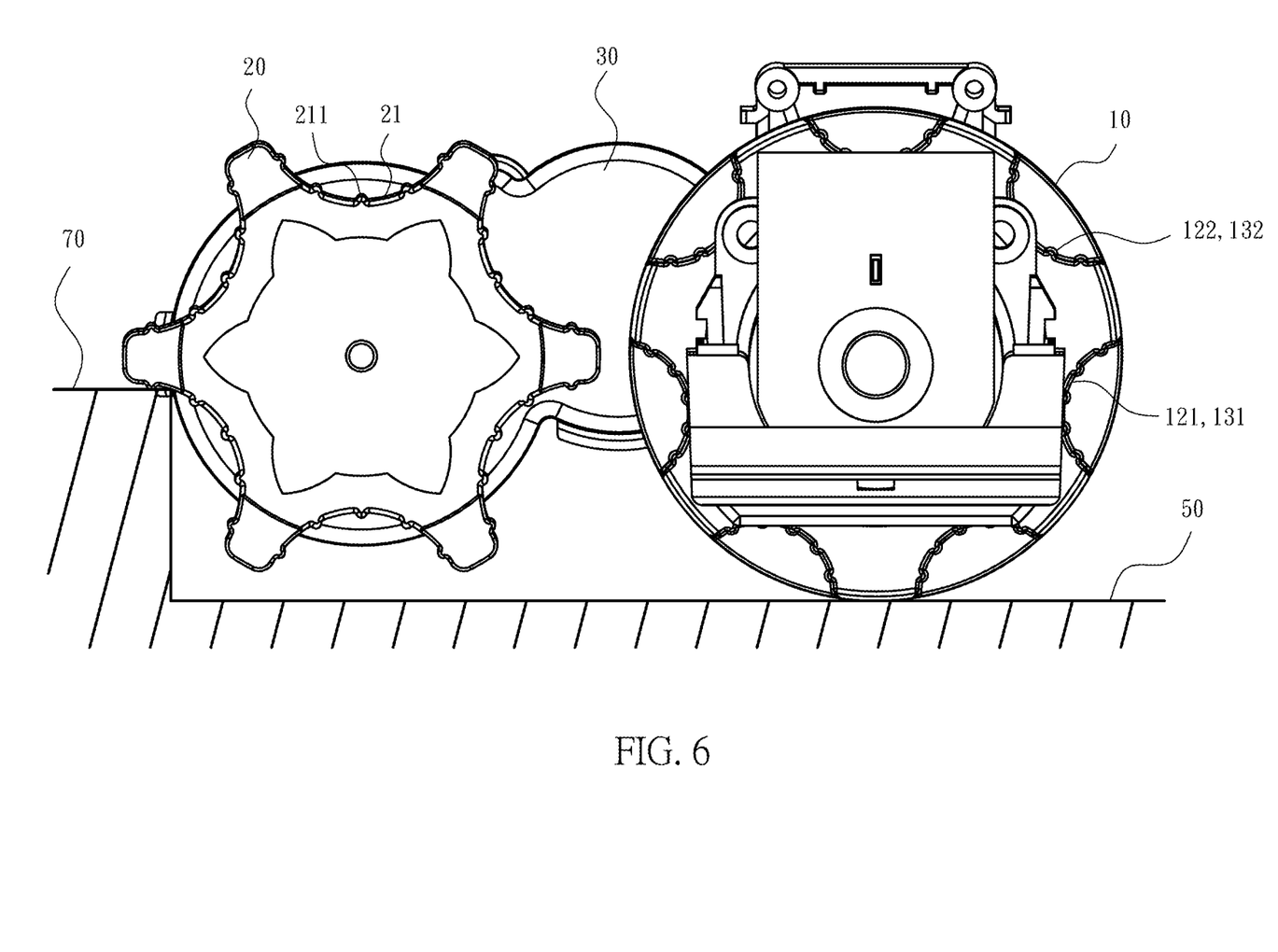
FIG. 6 is a schematic view showing the climbing state of the robot of the present invention.

As such, when the robot is moving in its path, although the obstacle-crossing body 20 is a distance from the plane 50, but because the linkage body 30 is connected to the wheel body 10 and the obstacle-crossing body 20, as the wheel body 10 rotates, the linkage body 30 will drive the obstacle-crossing body 20 to rotate accordingly; and when the robot needs to perform the climbing action, one of the groove portions 21 of the obstacle-crossing body 20 will be abutting on a high plane 70, the robot can thus be moved to the position of the high plane 70 by the rotation of the obstacle-crossing body 20.

Furthermore, since the plurality of the groove portions 21 are provided around the obstacle-crossing body 20 to form a star-shaped wheel, when the robot climbs by the obstacle-crossing body 20, the high plane 70 of different heights can then be climbed by the robot. Specifically, assuming that the robot needs to climb the high plane 70 which having a height of 1 cm, when the obstacle-crossing body 20 is attached to the high plane 70, the height of the high plane 70 is only 1 cm, and the distance between the bottom of the groove portion 21 and the plane 50 is, for example, 3 cm, so that the groove portion 21 of the obstacle-crossing body 20 will only abut against the high plane 70 by the groove portion 21 near the outer ring. The robot can thus effectively climb the high plane 70; however, if the robot is to climb the height plane 70 having a height of 2.8 cm, when the obstacle-crossing body 20 is attached to the high plane 70, the height is high. The height of the plane 70 is 2.8 cm, so the groove portion 21 of the obstacle-crossing body 20 will abut the high plane 70 from a portion near the bottom of the groove portion 21 to facilitate the robot to climb the high plane 70.

Thereby, the present invention can provide obstacle-crossing or climbing function of the sweeping robot, reducing the probability that the sweeping robot may be trapped or unable to effectively climb when encountering an obstacle or a steep road surface.

In the description of the present invention, it is to be understood that the terms "forward", "reverse", "center", "horizontal", "upper", "down", "left", "right", "top", "bottom", "inside", "outside" and the like is based on the orientation or positional relationship shown in the drawings, and is merely for the convenience of describing the present invention and simplifying the description, rather than indicating or implying the device or component must have a specific orientation, be constructed and operated in a specific orientation, and therefore should not be construed as limiting the invention.

A detailed description of one possible embodiment of the present invention is provided above. However, this embodiment is not intended to limit the scope of the patent of the present invention. Equivalent implementations or changes that do not depart from the spirit of the invention should be included in the scope of the patent.

| Labels description: | | | |
|---|---|---|---|
| 10 | wheel body | 11 | wheel part |
| 12 | first obstacle-crossing part | 121 | first recessed portion |
| 122 | first fastening portion | 13 | second obstacle-crossing part |
| 131 | second recessed portion | 132 | second fastening portion |
| 20 | obstacle-crossing body | 21 | groove portion |
| 211 | third fastening portion | 30 | linkage body |
| 31 | gear set | 311 | wheel body driving wheel |
| 312 | connecting driven wheel | 313 | obstacle-crossing body driven wheel |
| 40 | driving device | 50 | plane |
| 60 | solid | 70 | high plane |

What is claimed is:

1. A robotic obstacle-crossing device, comprising:
a robot;
at least one wheel body, being disposed at a bottom position of the robot, and the wheel body comprises:
a wheel part;
a first obstacle-crossing part, being disposed on one side of the wheel part, and a plurality of first recess portions arranged on the periphery of the first obstacle-crossing part; and
a second obstacle-crossing part, being disposed on another side of the wheel part, and a plurality of second recess portions arranged on the periphery of the second obstacle-crossing part.

2. The robotic obstacle-crossing device of claim 1, wherein the inside of the first recessed portion is provided with a plurality of first fastening portions, with each of the first fastening portions being configured to engage with a solid.

3. The robotic obstacle-crossing device of claim 1, wherein the second recessed portion is provided with a plurality of second fastening portions, each of the second fastening portions being configured to engage with a solid.

4. The robot obstacle-crossing device according to any one of claim 1, wherein the first recessed portion is interlaced with the set position of the second recessed portion.

5. The robot obstacle-crossing device of claim 1, comprising a driving device connected to the wheel body, the driving device driving the wheel body to rotate.

6. A robotic obstacle-crossing device, comprising:
a robot;
at least one wheel body, being disposed at a bottom position of the robot; and
at least one obstacle-crossing body, being disposed at a bottom position of the robot, and adjacent to the wheel body, the periphery of the obstacle body being provided with a plurality of groove portions;
wherein, the position of the obstacle-crossing body is higher than the wheel body, when the periphery of the wheel body is in contact with a plane, the periphery of the obstacle-crossing body is a distance away from the plane.

7. The robotic obstacle-crossing device of claim 6, wherein the wheel body comprises:
a wheel part;
a first obstacle-crossing part, being disposed on one side of the wheel part, and the first obstacle-crossing part being provided with a plurality of first recess portions; and a second obstacle-crossing part, being disposed on another side of the wheel part, and the second obstacle-crossing part being provided with a plurality of second recess portions.

8. The robotic obstacle-crossing device of claim 7, wherein the first recessed portion is interlaced with the set position of the second recessed portion.

9. The robotic obstacle-crossing device of claim 6, comprising:
   a linkage body, being coupled to the wheel body and the obstacle-crossing body, to allow the wheel body and the obstacle-crossing body being simultaneously actuated.

10. The robotic obstacle-crossing device of claim 9, wherein the linkage body is provided with a gear set, the gear set comprising:
   a wheel body driving wheel, being connected with the wheel body;
   a connecting driven wheel, being peripherally meshed with the wheel body driving wheel, and the connecting driven wheel rotating in opposite direction to the wheel body driving wheel; and
   an obstacle-crossing driven wheel being coupled to the obstacle-crossing body, the periphery of the obstacle-crossing body driven wheel meshing with the connecting driven wheel, and the obstacle-crossing driven wheel rotating in opposite direction to the connecting driven wheel.

11. The robotic obstacle-crossing device of claim 6, wherein the first groove portion is internally provided with a plurality of third fastening portions, each of the third fastening portions being provided to engage with a solid.

\* \* \* \* \*